United States Patent [19]

Gandhi et al.

[11] 4,062,808

[45] * Dec. 13, 1977

[54] STABILIZED RHENIUM CATALYST

[75] Inventors: Haren S. Gandhi, Dearborn Heights; Mordecai Shelef, Southfield; Henryk K. Stepien, Detroit; Hsien C. Yao, Dearborn Heights, all of Mich.

[73] Assignee: Ford Motor Company, Dearborn, Mich.

[*] Notice: The portion of the term of this patent subsequent to Feb. 1, 1994, has been disclaimed.

[21] Appl. No.: 719,048

[22] Filed: Aug. 30, 1976

Related U.S. Application Data

[63] Continuation-in-part of Ser. No. 607,658, Aug. 25, 1975, Pat. No. 4,006,106.

[51] Int. Cl.$^2$ .................. B01J 21/04; B01J 21/06; B01J 21/08; B01J 23/36

[52] U.S. Cl. .................. 252/454; 252/461; 252/463; 423/213.2

[58] Field of Search .................. 252/454, 461, 463; 423/213.2

[56] References Cited

U.S. PATENT DOCUMENTS 3,899,444  8/1975  Stephens .................. 252/463 X Primary Examiner—W. J. Shine
Attorney, Agent, or Firm—William E. Johnson; Keith L. Zerschling

[57] ABSTRACT

This disclosure teaches a stabilized rhenium catalyst in which the rhenium does not volatilize away from a catalyst substrate when oxidized to its higher valence state. The rhenium is protected by having sufficient refractory oxide available on the catalyst substrate to trap any higher oxide of rhenium developed when the rhenium is oxidized.

4 Claims, No Drawings

STABILIZED RHENIUM CATALYST

This application is a continuation in part of our previous application Ser. No. 607,658 filed Aug. 25, 1975 now patent 4,006,106 for "Stabilized Rhenium Catalyst." The purpose of filing this continuation in part application is to set forth further teachings which we have developed relating to the stabilization of rhenium catalyst systems. We have found in our recent work that the ratio of rhenium to protective material is a critical parameter for stabilizing rhenium and that the BET surface area of the protective material also plays a function in the amount of material which is necessary for protective purposes.

BACKGROUND OF THE INVENTION

U.S. Patent application Ser. No. 528,829, entitled "Rhenium Catalyst for Decreasing Nitrogen Compounds in Exhaust Gases," now abandoned, teaches that rhenium is useful in decreasing certain oxides of nitrogen found in exhaust gases of a motor vehicle. This application is assigned to the same assignee as the present application and is incorporated herein by reference.

The mentioned application discloses that rhenium can be used under reducing conditions to eliminate oxides of nitrogen found in an exhaust gas stream. In order to produce reducing conditions for the rhenium catalyst, the engine producing the gas stream is operated at a rich air fuel ratio between from about 12.9 to about 14.1 whereby the exhaust gas stream is deficient in oxygen and, therefore, reducing in nature. The exhaust gas stream passes over the rhenium catalyst in order to have oxides of nitrogen removed therefrom by catalytic action.

While rhenium is in its metallic form under reducing conditions, it will oxidize when exposed to oxygen. This can occur in an automotive vehicle when the air fuel ratio is lean, that is, when more oxygen is present than is necessary to burn the fuel present. Lean conditions of a few seconds duration occur during various periods of normal engine operation.

When oxidizing or lean conditions occur, rhenium oxidizes from its metallic form to an oxide having a +4 valence and subsequently to an oxide having a +7 valence. The +4 valence oxide of rhenium is stable and is not volatile at catalyst operating temperatures. However, an unprotected +7 valence oxide of rhenium has a sufficient vapor pressure to volatilize under catalyst operating temperatures. In order to protect rhenium from volatilization and thus maintain the operating efficiency of the catalytic converter for a prolonged period of time, the converter must be protected from oxygen. One way this can be accomplished is by a careful control of the air fuel ratio so that it always is on the rich side. Such a control on the air fuel ratio is difficult and expensive.

As an alternate approach to attempting to control the air fuel ratio so that it is always on the rich side, we have developed a way of stabilizing the higher valence oxide of rhenium so that it is not volatilized away under converter operating conditions. It is, therefore, a principal object of this invention to provide a rhenium catalyst system which is effective in the reduction of oxides of nitrogen under reducing conditions but is not volatilized away when oxidized to its higher valence state when the catalytic converter is subjected to oxidizing conditions.

SUMMARY OF THE INVENTION

This invention relates to a rhenium catalyst and, more particularly, to a rhenium catalyst wherein the rhenium, when oxidized to its higher valence state, is protected from volatilizing away under operating conditions normally found in an automotive catalytic converter.

In accordance with the teachings of this invention, a rhenium catalyst resistant to being volatilized away after oxidation to its higher valence state includes the following. A substrate formed of a ceramic material has rhenium metal deposited thereon. The rhenium metal is deposited in a finely divided state so that it is effective under reducing conditions to treat exhaust gases containing oxides of nitrogen. Sufficient refractory oxide coating is also deposited on the substrate to trap any higher oxide rhenium which may volatilize when the rhenium is oxidized on the substrate to its higher valence state. Under normal operating conditions, the rhenium on the substrate is subjected to a reducing atmosphere and the rhenium is in its metallic form. However, when the atmosphere surrounding the catalyst changes to an overall oxidizing one, the rhenium is oxidized to its higher valence state. With sufficient refractory oxide coating present, the higher valence rhenium oxide is trapped after volatilization by the refractory oxide coating and reduced to the lower valence, nonvolatile rhenium oxide.

In accordance with certain preferred teachings of this invention, the substrate is treated so that it contains in excess of 15% by weight of the substrate of the refractory oxide coating which protects the rhenium. If one desires, however, to save on the cost of such a refractory oxide coating, we have recently found that if one uses a refractory oxide coating having a BET surface area in excess of 175 square meters per gram, one may stabilize rhenium by having at least 15 units of weight of refractory oxide present for each unit of weight of rhenium present. If the refractory oxide material has a BET surface area in excess of 75 square meters per gram, one must use at least 30 weight units of protective refractory oxide material for each weight unit of rhenium in order to stabilize the same.

DETAILED DESCRIPTION OF THE PREFERRED EMBODIMENT

This invention is based upon the discovery that rhenium when oxidized to its higher valence state will not be volatilized away from a catalyst substrate if there is sufficient refractory oxide present on the catalyst substrate. The substrate, which is formed of a ceramic, can have a refractory oxide coating thereon in excess of 15%, and preferably 25%, by weight of the total weight of the substrate in order to protect the rhenium under oxidizing conditions. One may utilize the above-mentioned amounts of refractory oxide if desired. However, we have recently discovered that rhenium may be protected even though less refractory oxide material is used. If one desires to save cost by reducing the refractory oxide coating, one may still obtain the benefits of protecting the rhenium if the amount present falls within the following guidelines. We recommend, however, that the large amount of refractory oxide be utilized as is this material is generally inexpensive. In any case, however, we have discovered that rhenium may be protected by a refractory oxide coating having a BET surface area of at least 175 square meters per gram if that refractory oxide coating is present on the substrate in a ratio of 15 units by weight of refractory oxide for each unit of weight of rhenium. If the refractory oxide coating has a BET surface area of about 75 square meters per gram, it is necessary to have about 30 weight units of the refractory oxide present for each weight unit of rhenium present.

Rhenium is used under reducing conditions to eliminate oxides of nitrogen from the exhaust gas stream of a motor vehicle. Under the reducing conditions, the rhenium is present as metallic rhenium. However, any automotive system is subjected at times to lean air fuel mixtures in which an excess of oxygen is present. When such an oxidizing ambient comes in contact with a rhenium catalyst, if that catalyst is unprotected, there is a possibility of volatilizing away a volatile form of the rhenium. Under oxidizing conditions rhenium first oxidizes to a +4 valence oxide. This oxide form is stable in an oxidizing environment and will not be volatilized away when exhaust gases are passed over the catalyst at the elevated temperatures associated with the operation of the converter. However, if sufficient oxygen is present, rhenium will be oxidized to a compound in which the rhenium compound is left unprotected, it is volatile and is carried away by the movement of the exhaust gases thereover. Such volatilization of the rhenium over a period of time, of course, renders the catalytic converter ineffectual for its intended use.

We have found, however, that in the presence of sufficient refractory oxide, such as gamma alumina, on the ceramic substrate the higher valence state rhenium will not be volatilized away from the substrate. We have found that when sufficient refractory oxide is present on the substrate, the surface area associated with the rhenium compound when in its higher valence state is substantially reduced to a small fraction of the surface area associated with the rhenium when in its metallic state. We believe that the reduction in surface area associated with the higher valence state rhenium compound means that under oxidizing conditions when sufficient refractory oxide is present the higher valence state rhenium compound somehow draws itself into a more compact form.

When the higher valence rhenium has been drawn into its more compact form, whatever rhenium that volatilizes from the surface of the more compact form will be protected as follows. A volatilized $Re_2O_7$ molecule, by striking a pore wall of the deposited refractory oxide coating, will itself deposit two $Re_2O_2$ entities with the liberation of excess oxygen. The rhenium in this form is in its lower valence state and is nonvolatile.

We have by absorption techniques found that finely divided metallic rhenium dispersed on a refractory oxide deposited on a catalyst substrate will have a very large surface area with respect to its total volume. This same rhenium when oxidized to its +4 valence state will still remain in a finely divided form and will maintain its very large surface area provided that the relationship of total rhenium to the available surface area of the refractory oxide coating on the substrate remains within certain limits. If such limits are exceeded the excess rhenium will coalesce under oxidizing conditions into large particles of $Re_2O_7$. The transition from one form of oxide into another is reversible. Thus, if under prolonged use of several seconds under oxidizing conditions the metallic rhenium will be oxidized and will aggregate into large particles of its higher valence oxide. However, if sufficient refractory oxide coating is present on the ceramic substrate, the loss of the volatile oxide will be prevented. The prevention comes about because the refractory oxide will develop a very large and interconnected pore structure and any volatilized $Re_2O_7$ molecule will deposit two $ReO_2$ entities when it strikes a pore wall of the refractory oxide coating. The $Re_2O_7$ also gives up excess oxygen which might oxidize more of the lower valence oxide to start the process all over. Thus, rhenium in the higher oxide condition does not escape the system but is trapped when volatilized by the pore network of the refractory oxide. Suitable refractory oxide coatings for accomplishing this function includes gamma alumina, silica, magnesia, titania, thoria, zirconia, or mixtures thereof. This same rhenium when reduced returns to a condition in which the rhenium has its original high surface area.

In order to demonstrate the durability of the rhenium catalyst system protected in the manner set forth herein with a refractory oxide, certain tests were carried out. Under experimental conditions, more severe than found in the actual operation of a catalytic converter, the follow tests were carried out. A stream of gas at 853° C containing 2.5% by volume oxygen in nitrogen was passed over a catalyst sample at a space velocity of 100,000 hours$^{-1}$. An American Lava ceramic catalyst substrate containing 10% of its weight formed of gamma alumina deposited as a wash coat and a 1% by weight rhenium had a weight loss of rhenium of 2.1% per hour. A similar substrate containing 25% of its weight of gamma alumina deposited as a wash coat with a 1% by weight rhenium loading recorded no weight loss of rhenium when exposed to the gas stream at a temperature of 877° C. This shows us that even under the severe operating conditions of the test, the catalyst substrate having a sufficient amount of gamma alumina present thereon does protect the higher valence compound of rhenium.

Under normal catalyst operating conditions, the temperature would be about 650° C with no more than 1/2% by volume of oxygen in the gas stream. Of course, under these conditions the unstabilized rhenium catalyst rate of weight loss would be reduced somewhat but it still would have a weight loss which would cause the useful life of the converter to be substantially reduced.

The amount of rhenium to be placed on a catalyst substrate in order to form a catalytic converter is discussed in the mentioned application. So long as sufficient refractory oxide is present on the substrate to protect the rhenium, the rhenium will have a long and useful life as a device for eliminating undesirable oxides of nitrogen from engine exhaust gas streams. If sufficient refractory oxide is not present, the rhenium will not be stabilized and it will all disappear from the substrate over a period of time. The way of depositing finely divided rhenium on a substrate is also described in our copending application which is incorporated herein by reference.

ADDITIONAL TEACHINGS

Since the filing of our application 607,658 we have carried on further work in the field of stabilizing rhenium. We have found that if one desires to reduce the amount of stabilizing materials present, one may do so and still stabilize rhenium if certain guidelines are followed. The first guideline is to ascertain the BET surface area of the stabilizing material. BET surface area is a measurement of the surface area of the refractory oxide coating by a liquid nitrogen absorption technique at liquid nitrogen temperatures. The greater the surface area, the less amount of material is required to stabilize the rhenium. For example, if the measured BET surface area of the refractory oxide is in excess of 175 square meters per gram, then one needs at least 15 weight units of stabilizing material per each weight unit of rhenium. It is preferred to have at least about 20 weight units of the stabilizing refractory oxide per each weight unit of rhenium. If the stabilizing refractory oxide has a BET surface area just exceeding 75 square meters per gram, then it is necessary to have at least 30 weight units of the stabilizing material present per each weight unit of rhenium present on the substrate. With this lower surface area to weight ratio material, it is preferred to have as much as 40 weight units of the material present for each weight unit of rhenium present.

In view of this specification, those skilled in the art will be able to develop many modifications of this invention which fall within the true spirit and scope thereof. It is intended that all of these modifications be included within the scope of the appended claims.

What we claim is:

1. A rhenium catalyst resistant to volatilization after oxidation to a higher oxidation state consisting of:
   a substrate formed of a ceramic material;
   a refractory oxide coating on said substrate, said refractory oxide coating having a BET surface area of at least 175 square meters per gram; and
   rhenium metal deposited on said substrate in a finely divided form;
   said refractory oxide coating being present on said substrate by weight in a ratio of at least 15 units of refractory oxide coating for each unit of weight of rhenium present on said substrate.

2. The rhenium catalyst of claim 1 wherein: said refractory oxide coating is selected from the group of gamma alumina, silica, magnesia, titania, thoria, zirconia or mixtures thereof.

3. A rhenium catalyst resistant to volatilization after oxidation to a higher oxidation state consisting of:
   a substrate formed of a ceramic material;
   a refractory oxide coating on said substrate, said refractory oxide coating having a BET surface area just exceeding 75 square meters per gram;
   rhenium metal deposited on said refractory substrate in a finely divided form; and
   said refractory oxide coating being present on said substrate by weight in a ratio of at least 30 units by weight of refractory oxide for each unit by weight of rhenium present on said substrate.

4. The rhenium catalyst of claim 3 wherein: said refractory oxide coating is selected from the group of gamma alumina, silica, magnesia, titania, thoria, zirconia or mixtures thereof.

* * * * *